United States Patent [19]

Cohen

[11] Patent Number: 5,110,296

[45] Date of Patent: May 5, 1992

[54] EDUCATIONAL DEVICE FOR TEACHING A CHILD TO TIE A BOW

[76] Inventor: Martha G. Cohen, 18 West Valley Brook Rd., Long Valley, N.J., 07853

[21] Appl. No.: 667,824

[22] Filed: Mar. 12, 1991

[51] Int. Cl.⁵ .............................................. G09B 19/24
[52] U.S. Cl. .................................................... 434/260
[58] Field of Search ........................ 434/258, 259, 260

[56] References Cited

U.S. PATENT DOCUMENTS

| | | | |
|---|---|---|---|
| D. 143,237 | 12/1945 | Pares | 434/260 |
| 2,313,874 | 3/1943 | Hume | 434/260 |
| 2,385,197 | 9/1945 | Eisel | 434/260 |
| 4,764,119 | 8/1988 | Miraglia | 434/260 |
| 4,978,304 | 12/1990 | Alexander | 434/260 |

*Primary Examiner*—Gene Mancene
*Assistant Examiner*—Michael Lynch

*Attorney, Agent, or Firm*—McAulay Fisher Nissen Goldberg & Kiel

[57] ABSTRACT

An educational device is disclosed which includes a wooden block having an artistic image thereon, generally in the form of an animal to which the child can relate. The image is divided into left and right portions, and a differently colored lace is attached to each of the portions. The left portion of the image has a positioning indicia of a color matching the color of the right lace and the right portion of the image has a positioning indicia of a color matching the color of the left lace. The left portion of the image also has a loop defining indicia of a color matching the color of the right lace and the right portion of the image has a loop defining indicia of a color matching the color of the left lace. The child positions the laces by matching the coloring of the laces with the respective color coded indicia of the image in a manner to teach a child to tie a bow.

5 Claims, 2 Drawing Sheets

EDUCATIONAL DEVICE FOR TEACHING A CHILD TO TIE A BOW

BACKGROUND OF THE INVENTION

1. Field of the Invention

This invention relates generally to an educational device and, more specifically, to a teaching aid designed to help a child tie a bow.

2. Description of the Prior Art

Teaching a child to tie a bow, such as required when tying shoelaces, can be a frustrating experience for many children. The same is true for retarded and mentally handicapped persons regardless of age. The learning comes through repeated trial and experience based on personal instruction by a teacher, generally in the kindergarten level of elementary education.

Children can also be shown pictures, slides or film illustrating the various stages of tying the bow. However, this has not proven to be a satisfactory technique for keeping the child's attention.

A problem often encountered in the teaching process is identifying and distinguishing the laces as left and right hand laces, particularly where the concept of left hand and right hand is not fully understood by the child. Even where the differences between left and right are understood, the laces respectively positioned on one side of the shoe become repositioned on the other or opposite side of the shoe during the tying procedure which contributes to the child's confusion. Accordingly, the designation of the shoelaces as a left lace and a right lace in the teaching process also is not entirely satisfactory.

Still another technique involves utilizing a device, such as a toy wooden shoe, having a pair of shoelaces attached thereto on which a child can practice. The problem encountered with this technique is that it does little in teaching the child how to form the loops necessary in tying the bow.

The present invention improves on the heretofore known techniques in providing an educational device which incorporates an artistic image of an animal familiar to the child, and which is provided with color coded indicia and colored laces. The colored laces are positioned in a match-up relation with the color coded indicia to teach the child how to form the loops and tie the shoelaces in a manner hereinafter described.

SUMMARY OF THE INVENTION

The educational device of the present invention comprises a wooden block having a predetermined image of an animal familiar to the child printed or otherwise affixed to the planar surface of the block. The image may be regarding as being divided into a left portion and a right portion.

A pair of color coded laces, defined as a left lace and a right lace, are attached to the corresponding left and right portions of the image, and extend outwardly therefrom. The left lace is formed having a first color indicia and the right lace is formed having a second color indicia.

The left portion of the image has a region representing positioning indicia of a color which matches the color of the right lace, and the right portion of the image also has a region representing positioning indicia of a color which matches the color of the left lace. The left portion of the image also has another region representing loop defining indicia of a color matching the color of the right lace, and the right portion of the image similarly has another region representing loop defining indicia of a color matching the color of the left lace.

In utilizing the device, a child first positions the colored laces on the matching colored positioning indicia and then ties a knot. The child then positions the colored laces on the matching colored loop defining indicia to form the necessary loops whereupon another knot is made to tie a bow.

Additional features and advantages of the present invention will become more apparent from a consideration of the following detailed description when taken in conjunction with the accompanying drawings.

DESCRIPTION OF THE PREFERRED EMBODIMENT

Figure 1:
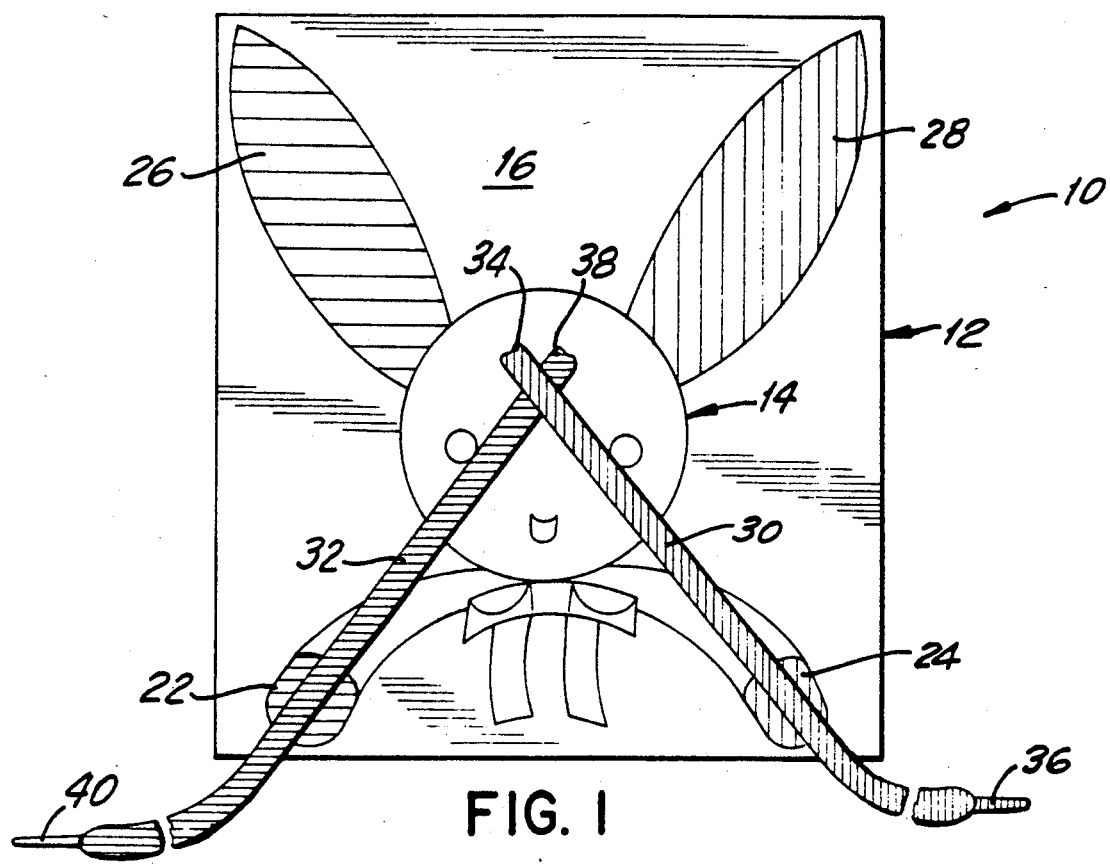
FIG. 1 is a top plan view of the educational device constructed in accordance with the present invention showing the colored laces positioned on the matching colored positioning indicia of the image.

Referring to the drawings, numeral 10 represents an educational device for teaching a child to tie a bow. Device 10 is in the form of a rectangular-shaped block of wood 12 having an image 14 printed or otherwise affixed to the top planar surface 16 of the block. It will be appreciated that the shape of block 12 may be varied so that the invention is not limited to any particular configuration of the block. Also, block 12 may be made of other materials such as metal or plastic. As such, block 12 may be regarded as constituting any suitable substrate having the image 14 thereon.

Image 14 either may be printed directly on surface 16 or, alternatively, the image may be drawn or printed on a decal element which is secured to surface 16 by a pressure sensitive adhesive, or the like. Image 14 is in the form of an artistic rendering representative of a bunny rabbit which was selected because of the warm and friendly association that a child makes with such a animal. However, the image may be varied to include other animals such as a dog, or a rodent in the form of a mouse.

Image 14 is defined as having a left side portion 18 and a right side portion 20 which are disposed on the opposite sides of a vertical center line of said image dividing and separating said portions from one another. In the preferred embodiment, the left and right portions of the image are symmetrical on opposite sides of the vertical center line.

The left portion 18 of image 14 has a surface region 22 representing positioning indicia of a particular color. In the illustrated embodiment, surface 22 is lined for the color blue. Similarly, the right portion 20 of image 14 also is formed having a surface region 24 representing positioning indicia lined for the color red. Colored indicia 22 and 24 represent the extremities of what may be regarded as the arms of the bunny located at approximately the lower corners of the image.

The left portion 18 of image 14 also is formed having another surface region 26 representing loop defining indicia lined for the color blue. Similarly, the right portion 20 of image 14 also is formed having another surface region 28 representing loop defining indicia lined for the color red. Colored indicia 26 and 28 represent an artistic rendering of the bunny's ears located in the upper portion of the image.

For reasons that will become hereinafter apparent, the color of positioning indicia 22 matches the color of loop defining indicia 26, and the color of positioning indicia 24 matches the color of loop defining indicia 28. It will be appreciated that the color indicia does not necessarily mean the preferred solid color arrangement illustrated in the drawing. Rather, the color indicia can be any form of partial or complete coloring employing individual colors or multiple colors for each indicia so long as there is correspondence between the respective indicia on each side portion of the image.

A pair of laces represented by numerals 30 and 32 are attached to the block 12 and extend forwardly of image 14. That is, one end 34 of lace 30 is secured to the block while the opposite or free end 36 projects outwardly of the block. Similarly, one end 38 of lace 32 is secured to block 12 while the free end 40 projects outwardly therefrom. For this purpose, a pair of holes (not shown) are formed in the block through which the securing ends of the respective laces pass whereupon said ends are knotted to secure the laces in place. Laces 30 and 32 may be formed of any kind of flexible material such as fabric or cord, or the like. Also, the laces are sturdy and easy to grasp for the child's small hands that, at this early stage in development, lack dexterity and coordination.

Lace 30 has its securing end 34 attached to the left portion 18 of image 14 whereas the lace 32 has its securing end 38 attached to the right portion 20 of the image. As such, lace 30 is defined as the left lace while lace 32 is defined as the right lace. The positioning of the securing ends 34 and 38 of the respective laces 30 and 32 are spaced apart a predetermined distance along a horizontal line that is perpendicular to the vertical center line defining the left and right portions of the image. Further, left lace 30 is of a color matching the color of the right portion 20 of image 14 whereas the right lace 32 is of a color matching the left portion 18 of the image. The correspondence between the coloring of the laces and the coloring of the various indicia on the image is an important feature in utilizing device 10 as a teaching aid as hereinafter described.

Specifically, as shown in FIG. 1, the child is instructed to initially position the laces by locating right lace 32 in overlying relation to positioning indicia 22 and similarly position lace 30 in overlying relation to indicia 24. The child is able to readily make this association since there is correspondence between the coloring of the laces and the associated indicia. The child is then instructed to tie a knot which generally presents no problem.

Figure 2:
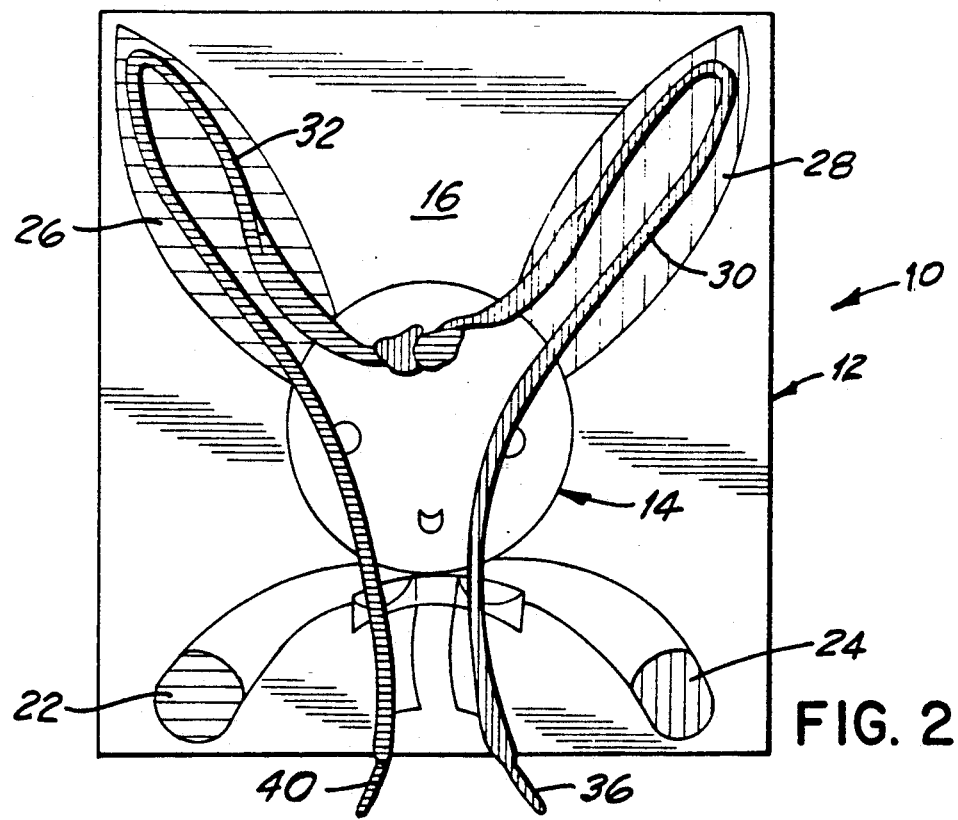
FIG. 2 is a view similar to FIG. 1 showing the colored laces positioned on the matching colored loop defining indicia of the image.
Figure 3:
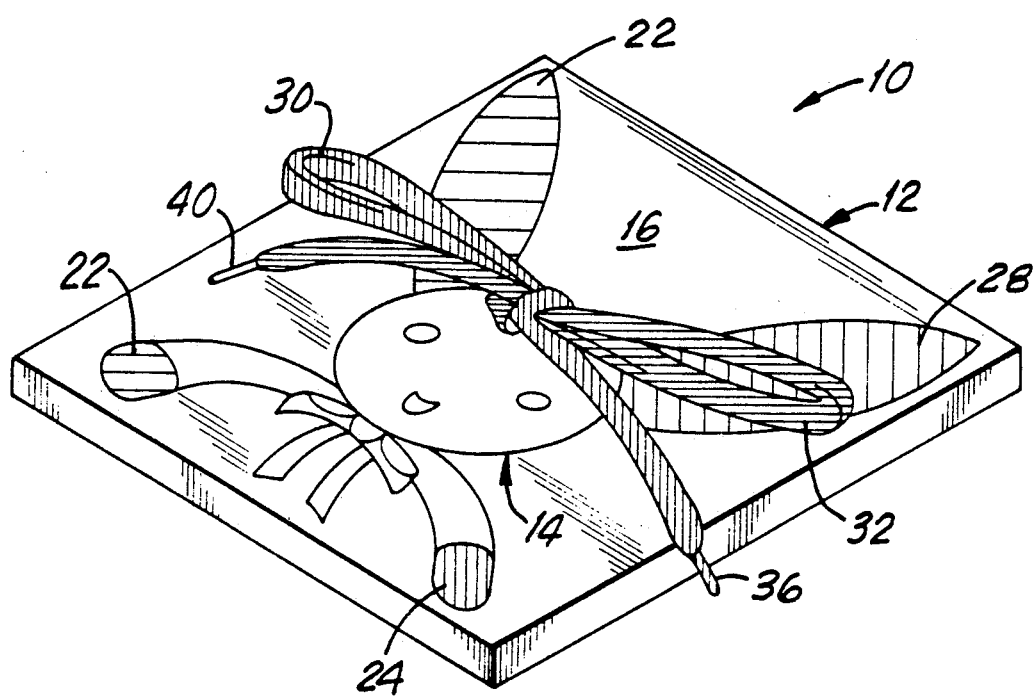
FIG. 3 is a perspective view of the device illustrated in the FIG. 1 showing the colored laces tied to form a bow.

Thereafter, the child is instructed to position lace 30 in overlying relation to loop defining indicia 28 thereby forming a loop by conforming the lace to the shape representative of said loop defining indicia. In a similar fashion, the child then forms a loop with lace 32 by positioning said loop in overlying relation to loop defining indicia 26 and following the contour of said indicia. Here, again, the child is able to readily comply with this instruction since there is correspondence between the coloring of the laces and the associated loop defining indicia. The formation of such loops is illustrated in FIG. 2. The child then grips the respective loops and makes another knot thereby tying a bow as illustrated in FIG. 3.

The device herein encourages the child to keep-on tying the laces because of the bright colors and cute face, and because it looks easy to do. The colored ears of the bunny representing the loop defining indicia provide a visual anchor to the child who may not yet grasp the distinction between right and left. The child need only follow the color pattern matching technique described above to accomplish the task which becomes a game and fun to the child.

While a preferred embodiment of the invention has been shown and described in detail, it will be readily understood and appreciated that numerous omissions, changes and additions may be made without departing from the spirit and scope of the present invention.

I claim:

1. An educational device for teaching a child to tie a bow comprising:
    a substrate having a predetermined image thereon, said image being divided into left and right portions;
    left and right laces attached to said substrate and extending forward from said image;
    said left lace being attached to the left portion of said image and said right lace being attached to the right portion of said image;
    said left lace having a first color indicia and said right lace having a second color indicia;
    the left portion of said image having a positioning indicia of a color matching the color of said right lace and the right portion of said image having a positioning indicia of a color matching the color of said left lace;
    the left portion of said image having a loop defining indicia of a color matching the color of said right lace and the right portion of said image having a loop defining indicia of a color matching the color of said left lace;
    whereby said positioning indicia and said loop defining indicia are employed as an aid in teaching a child to tie a bow with said laces.

2. The educational device of claim 1, wherein said left and right laces are spaced apart a predetermined distance along a horizontal line perpendicular to a vertical center line dividing the left and right portions of said image.

3. The educational device of claim 1, wherein said positioning indicia are located at approximately the lower corners of said image.

4. The education device of claim 1, wherein said loop defining indicia are located in the upper portion of said image.

5. An educational device for teaching a child to tie a bow comprising:
    a substrate having a predetermined image thereon, said image being divided into left and right portions;
    left and right laces attached to said substrate and extending forward from said image, said left and right laces being spaced apart a predetermined distance along a horizontal line perpendicular to a vertical center line dividing the left and right portions of said image;

said left lace being attached to the left portion of said image and said right lace being attached to the right portion of said image;

said left lace having a first color indicia and said right lace having a second color indicia;

the left portion of said image having a positioning indicia of a color matching the color of said right lace and the right portion of said image having a positioning indicia of a color matching the color of said left lace, said positioning indicia being located at approximately the lower corners of said image;

the left portion of said image having a loop defining indicia of a color matching the color of said right lace and the right portion of said image having a loop defining indicia of a color matching the color of said left lace, said loop defining indicia being located in the upper portion of said image;

whereby said positioning indicia and said loop defining indicia are employed as an aid in teaching a child to tie a bow with said laces.

* * * * *